(12) United States Patent
House et al.

(10) Patent No.: US 7,113,883 B1
(45) Date of Patent: Sep. 26, 2006

(54) TEST CONFIGURATION AND DATA MANAGEMENT SYSTEM AND ASSOCIATED METHOD FOR ENTERPRISE TEST OPERATIONS

(75) Inventors: Richard W. House, Austin, TX (US); Cesar R. Gamez, Pflugerville, TX (US); Francis E. Hinkle, Jr., Austin, TX (US); Chandrasekhar Venkatraman, Austin, TX (US)

(73) Assignee: VI Technology, Inc., Austin, TX (US)

( * ) Notice: Subject to any disclaimer, the term of this patent is extended or adjusted under 35 U.S.C. 154(b) by 247 days.

(21) Appl. No.: 10/225,825

(22) Filed: Aug. 22, 2002

Related U.S. Application Data

(60) Provisional application No. 60/314,922, filed on Aug. 24, 2001.

(51) Int. Cl.
*G06F 19/00* (2006.01)
(52) U.S. Cl. .................................. 702/122; 707/10
(58) Field of Classification Search ............. 702/68, 702/80, 81, 118–123, 183, 184, 188, 724, 702/726; 714/724, 726, 30, 733, 38; 716/4; 717/102, 106–108; 707/10, 104.1, 200; 709/204
See application file for complete search history.

(56) References Cited

U.S. PATENT DOCUMENTS

| | | | |
|---|---|---|---|
| 4,493,079 A | 1/1985 | Hughes, Jr. ................. 714/738 |
| 4,748,573 A | 5/1988 | Sarandrea et al. .......... 702/108 |
| 5,021,997 A | 6/1991 | Archie et al. ................. 714/31 |
| 5,150,288 A | 9/1992 | Imai et al. ....................... 700/3 |
| 5,164,912 A | 11/1992 | Osborne et al. ............ 713/300 |
| 5,206,582 A | 4/1993 | Ekstedt et al. ............. 324/73.1 |
| 5,311,438 A | 5/1994 | Sellers et al. ................ 700/96 |
| 5,355,320 A | 10/1994 | Erjavic et al. .................. 716/4 |
| 5,751,941 A * | 5/1998 | Hinds et al. .................. 714/38 |
| 5,777,876 A | 7/1998 | Beauchesne ................. 700/98 |
| 5,822,717 A * | 10/1998 | Tsiang et al. ................ 702/108 |
| 5,845,234 A * | 12/1998 | Testa et al. ................. 702/119 |
| 6,023,694 A | 2/2000 | Kouchi et al. ................. 707/2 |
| 6,165,401 A * | 12/2000 | Schlossnikl et al. ........ 264/154 |
| 6,167,401 A | 12/2000 | Csipkes et al. ............... 707/10 |
| 6,182,075 B1 * | 1/2001 | Hsu ............................ 707/10 |
| 6,236,952 B1 | 5/2001 | Jun et al. .................... 702/119 |
| 6,326,952 B1 | 12/2001 | Amro et al. ................. 345/168 |
| 6,381,604 B1 * | 4/2002 | Caughran et al. ............ 707/10 |
| 6,393,435 B1 * | 5/2002 | Gartner et al. .............. 707/200 |
| 6,434,502 B1 | 8/2002 | Harrison ..................... 702/122 |

(Continued)

*Primary Examiner*—Marc S. Hoff
*Assistant Examiner*—Mohamed Charioui
(74) *Attorney, Agent, or Firm*—Brian W. Peterman; O'Keefe, Egan & Peterman, LLP

(57) ABSTRACT

Enterprise test configuration and data management systems and associated methods are disclosed for test, measurement and automation environments that allow management, configuration and analysis of test systems and associated data across enterprise-wide test operations. These systems and methods are directed to the production process from the test and test station point of view and provides a variety of mechanisms for test configuration and data management for test stations (or automated test equipment (ATEs)) including the capability of managing data about each test station, hardware resources, software resources, test configuration, test steps, acquired measurements, test execution, and/or other information related to the tests, the test stations or the units-under-test (UUT). Standardized interfaces are also contemplated for the test station (or ATE) software to communicate with server systems and other ATEs if needed, thereby greatly simplifying the coding required for these systems and allowing each test station (or ATE) to talk through the same standardized interface.

24 Claims, 13 Drawing Sheets

U.S. PATENT DOCUMENTS

| | | | |
|---|---|---|---|
| 6,442,714 B1 * | 8/2002 | Griffin et al. | 714/46 |
| 6,473,707 B1 | 10/2002 | Grey | 702/123 |
| 6,507,842 B1 | 1/2003 | Grey et al. | 707/5 |
| 6,546,524 B1 | 4/2003 | Chankramath et al. | 716/4 |
| 6,615,153 B1 * | 9/2003 | Liu et al. | 702/121 |
| 6,633,878 B1 | 10/2003 | Underwood | 707/100 |
| 6,681,351 B1 * | 1/2004 | Kittross et al. | 714/724 |
| 6,714,965 B1 * | 3/2004 | Kakuta et al. | 709/204 |
| 6,779,134 B1 * | 8/2004 | Laviolette et al. | 714/38 |
| 6,799,147 B1 | 9/2004 | Balasubramanian et al. | 702/186 |
| 2001/0012986 A1 | 8/2001 | Conan et al. | 702/188 |
| 2001/0037374 A1 | 11/2001 | Shrum et al. | 700/217 |
| 2001/0054044 A1 * | 12/2001 | Liu et al. | 707/104.1 |
| 2003/0040897 A1 * | 2/2003 | Hsu | 703/18 |

\* cited by examiner

TEST CONFIGURATION AND DATA MANAGEMENT SYSTEM AND ASSOCIATED METHOD FOR ENTERPRISE TEST OPERATIONS

RELATED APPLICATIONS

This application claims priority to the following provisional application: Provisional Application Ser. No. 60/314,922 entitled "TEST CONFIGURATION AND DATA MANAGEMENT SYSTEM AND ASSOCIATED METHOD FOR ENTERPRISE TEST OPERATIONS," which was filed on Aug. 24, 2001.

TECHNICAL FIELD OF THE INVENTION

This invention relates to configuration and management techniques for device and product test operations in test, measurement and automation environments.

BACKGROUND

Many companies, and specifically electronic and semiconductor device companies, produce products that must be tested to meet various specifications before the products can be shipped to customers. These test operations often include a variety of different test activities in a variety of different environments. Existing systems do not currently provide for efficient test configuration and data management among these disparate test operations, particularly on an enterprise-wide scale.

With respect to data management, test systems (also referred to herein as test stations and/or ATEs (automated test equipment)) have previously included the ability to store test result data from a unit-under-test (UUT) on the test systems. In addition, test sites have also previously included the ability to store centrally raw test data from a number of different test systems for historical purposes. FIG. 1A (prior art) shows an example of such an environment. Local test systems 106A, 106B . . . 106C are coupled through connections 114A, 114B . . . 144C to UUTs 116A, 116B . . . 116C, respectively. Looking at test system 106A as an example, each test system includes test software 112A, which operates the test being run on the UUT, and includes test management software 10A, which acts to manage the tests executed by the test software 112A. The raw test result data for the UUT can be stored in the local test systems 106A, 106B . . . 106C. In addition, this raw test data can be archived for historical purposes in a raw data archival system 102 through manual or direct data storage transfers as represented by dotted lines 115A, 115B . . . 115C, respectively.

With respect to connectivity, test stations or automated test equipment devices (ATEs) are often located on test floors that do not have network connections or that are configured in such a way as to make network connections to the ATEs rather difficult or impossible. In addition, many ATEs are designed to conduct specific tests that may be unrelated and unlinked to other device tests or manufacturing activities. Thus, test monitoring has previously focused on the individual test systems and has not adequately addressed enterprise level test monitoring and management. In addition, disparate tests and test stations typically do not have common data formats, but instead are often custom designed software packages that are interested in nothing but the operations of the particular test being run. Thus, if data is stored, it is often stored simply as a text file or in a proprietary format specific to the designer of the system. Although such raw test data has been stored centrally so that it can be retrieved at a later time for historical analysis, this raw test data is typically not formatted in any standard manner or managed such that it can be used as testing is in progress.

Tools have been previously developed to help connect test applications to other computers through a network, such as the LABVIEW enterprise connectivity toolset available from National Instruments. These tools allow connectivity to a database. However, these tools require the user to define the databases, communicate with them (usually through SQL commands) and program all the details about communication, database design and anything related to the database operations. As such, these tools do not provide an efficient and easily managed solution for configuring and managing enterprise test operations.

This need for systems to provide efficient test configuration and data management for test operations is distinct from a need for systems to monitor and manage manufacturing operations. Manufacturing execution systems (MES) have been developed that focus on controlling the execution of a manufacturing process including actions such as keeping track of materials, products, work in progress, etc. However, these MES systems are not directed to test operations. Example MES products are those that are sold under the trade names QFS available from Automation Programming, Inc. (API) and Xfactory available from USDATA. Such systems allow for the management of information about the manufacturing of the products. They are directed to a manufacturing point of view and are not directed to a testing point of view. Thus, such systems fall short on managing the test data and test results thereby making difficult the task of finding specific data about a test, and do not provide mechanisms to maintain configuration information about each test station or any tests run on each test station. In addition, such existing systems do not provide capabilities to monitor the test stations (or ATEs) and the data related to the ATEs. Without a direct connection between the ATEs and a server system, it is extremely difficult and complex to attempt to create software code that allows such capabilities.

SUMMARY OF THE INVENTION

The present invention provides an enterprise test configuration and data management system and associated method for test, measurement and automation environments that allow management, configuration and analysis of test systems and associated data across enterprise-wide test operations. The present invention is directed to the production process from the test and test station point of view and provides a variety of mechanisms for test configuration and data management for test stations including the capability of managing data about each test station, hardware resources, software resources, test configuration, test steps, acquired measurements, test execution, and/or other information related to the tests, the test stations or the units-under-test (UUT). The present invention also provides standardized interfaces for the test station (or ATE) software to communicate with server systems and other ATEs if needed, thereby greatly simplify the coding required for these systems and allowing each test station (or ATE) to talk through the same standardized interface.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides for efficient test configuration and data management among disparate test operations, particularly on an enterprise-wide scale. In general respects, the present invention allows an entity to manage its test operations and related test stations (or ATEs) on an enterprise level through an interface that can access a centralized database of test related information, including test input parameters, test input data, test result data, test system information, test configuration information, data management information or any other desired test operations related information. Through this interface, which may be Internet-based access through a web browser and a graphical user interface (GUI), a user can log into the enterprise test configuration and data management (ETCM) system to configure, manage and monitor enterprise-wide test operations. Test data from disparate test operations and test stations can be stored in the remotely accessible database, and the data formats can be standardized or controlled to provide efficient and enhanced data storage and to allow efficient access, configuration and management through the centralized database. Example embodiments are described below in more detail with respect to the drawings.

Figure 1A:
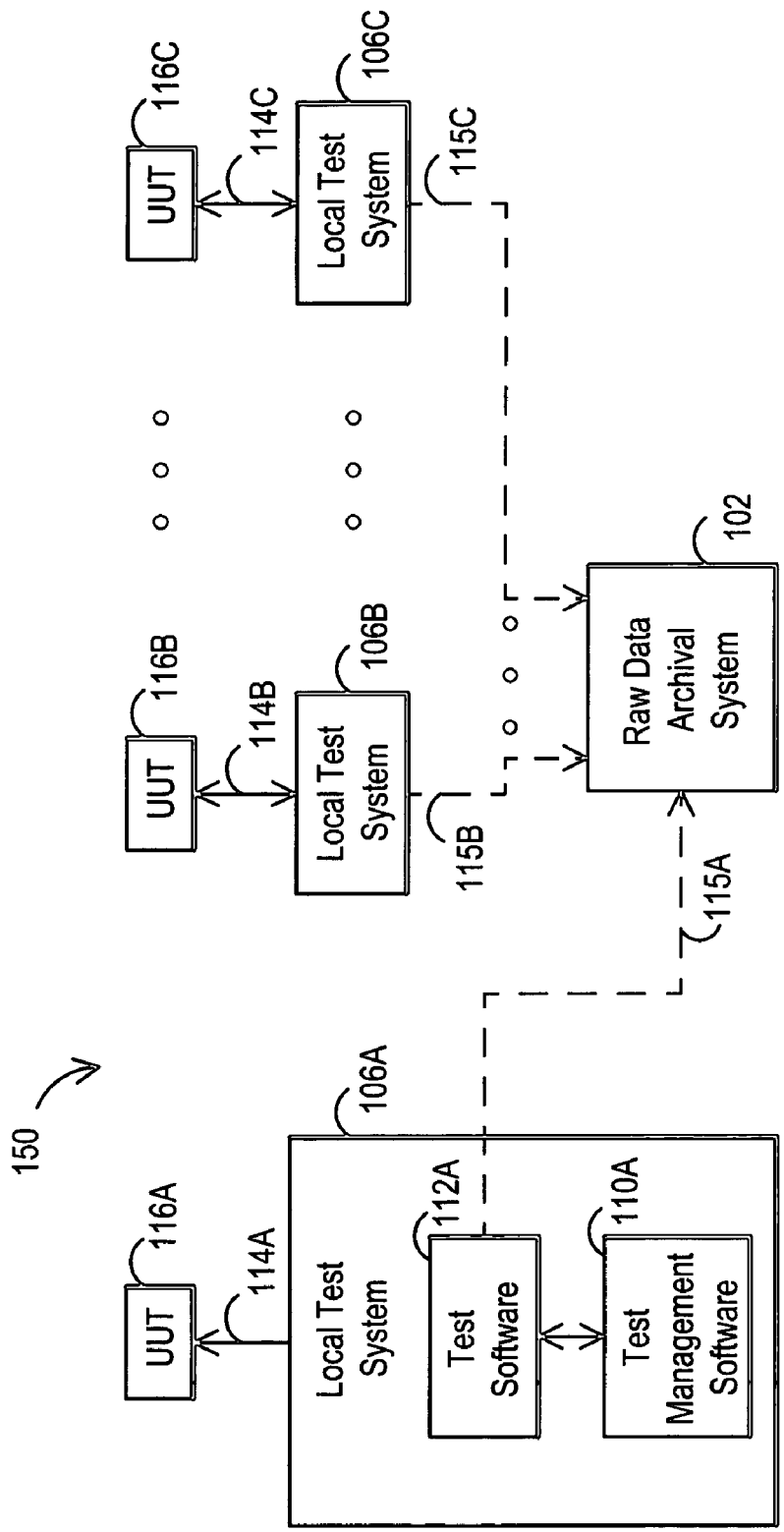
FIG. 1A (prior art) is a block diagram for an example of a conventional test site environment for test systems and units-under-test (UUTs).
Figure 1B:
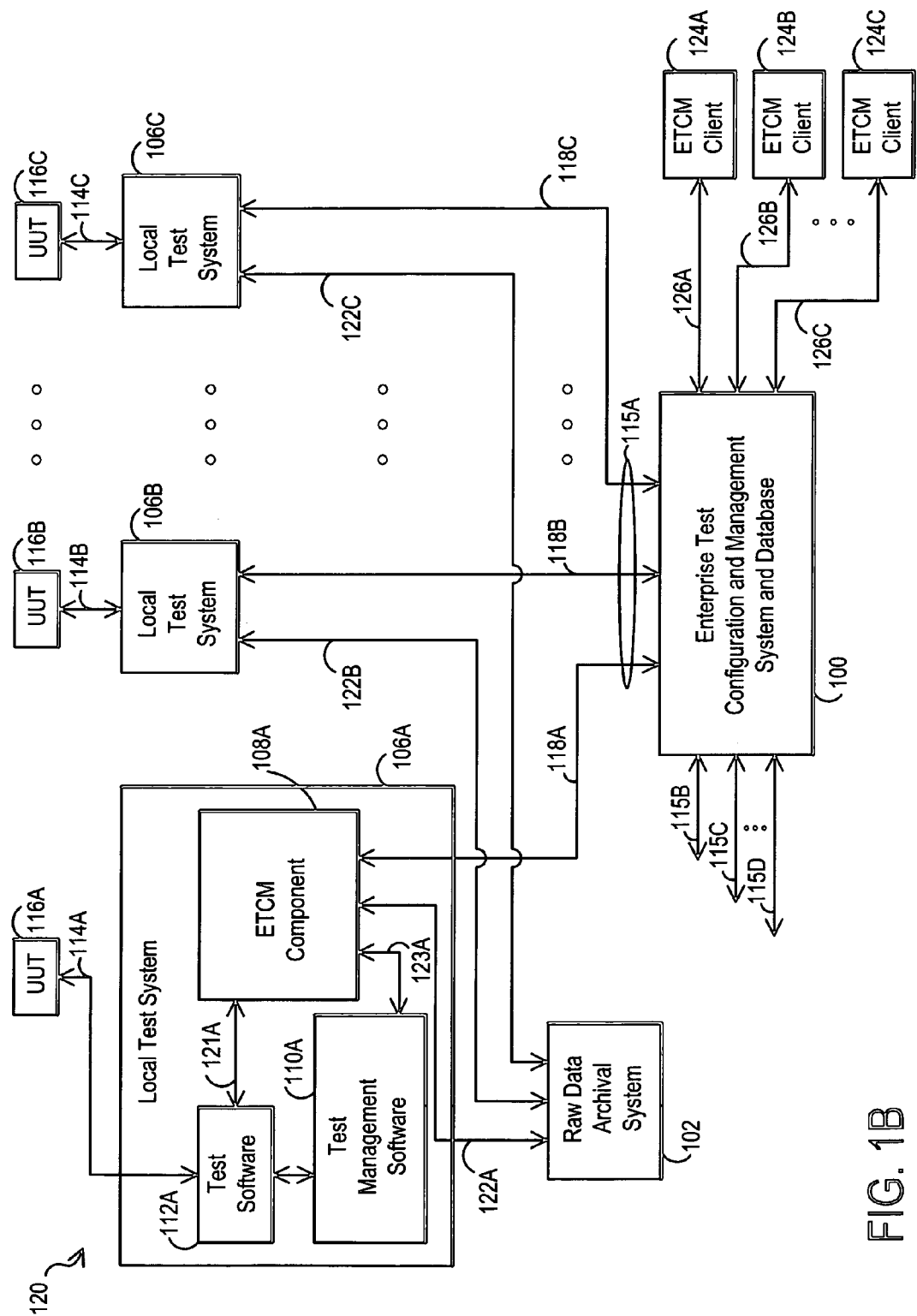
FIG. 1B is a block diagram for an enterprise test configuration and management (ETCM) system and database including an ETCM component residing on local test systems, according to the present invention.

FIG. 1B is a block diagram for a test environment 120 including an enterprise test configuration and management (ETCM) system and database 100, according to the present invention. Compared to the conventional environment described above with respect to FIG. 1A, the ETCM environment in FIG. 1B adds ETCM components to the local test systems, for example, ETCM component 108A within the local test system 106A. As depicted, the ETCM component 108A operates on the local test system and can be operationally connected to the test software 112A and the test management software 110A through interactions 121A and 123A, respectively. It is noted that the ETCM component 108A can be a software module that communicates with the test software 112A and the test management software 110A through appropriate application programming interfaces (APIs). The ETCM component 108A can also be a software subroutine operating as part of the test software 112A and/or the test management software 110A. The test software 112A operates to control the testing of the UUT 116A, while the test management software 110A operates to control test execution, for example, controlling which tests are actually run from a number of tests potentially executable by the test software 112A. It is further noted that traditional implementations for the test management software 110A, such as TESTSTAND software available from National Instruments have not attempted to manage test data, but rather have been directed to the management of the test programs.

The ETCM component operates to provide test configuration and data management functionality for the test system and communicates with ETCM system and database 100 through connection 118A. The ETCM component 108A can also communicate with a raw data archival system 102 through connection 122A, if desired. Similarly, the ETCM components in the other test systems 106B . . . 106C also communicate with the ETCM system and database 100 through connections 118B . . . 118C, respectively, and also communicate with the raw data archival system 102 through connections 122B . . . 122C, respectively. To provide remote configuration, management and monitoring of test operations, the ETCM system and database 100 also communicates with ETCM clients 124A, 124B . . . 124C through connections 126A, 126B . . . 126C, respectively. It is noted that the connections 118A, 118B . . . 118C and 126A, bx;1126B . . . 126C can be, for example, any desired communication media, including but not limited to intranet networks, wireless networks, the Internet, or any other device or system that allows systems to communicate with each other. The test systems 106A, 106B . . . 106C can be any desired test device or system utilized in a test, measurement and automation environment.

The ETCM system and database 100 can communicate with a number of different test sites and a number of different test lines at a given test site. Considering local test systems 106A, 106B . . . 106C as a number of different test systems located at a particular test site, the collective communication connections 118A, 118B . . . 118C from this site can be designated as connection 115A. Considering that an enterprise can include a number of different test sites, the connections 115B, 115C . . . 115D represent these additional test sites. Thus, the ETCM system and database 100 can be in communication with a large variety of different test sites and lines and the organization of this information and test operation structure can be configured by the user, if desired.

The collective ETCM components 106 and the ETCM system and database 100 together allow for a wide range of test configuration and data management functionality to be provided to ETCM clients 124. In short, the present invention links together, formats and standardizes the flow of control and test data among disparate test sites and associated test lines and test systems using a centralized ETCM system and database 100 and an ETCM component 108 operating with respect to the individual test stations. The present invention thereby provides for a wide variety of useful functions, including management, monitoring, alarm notification and reporting of enterprise test activity.

Figure 1C:
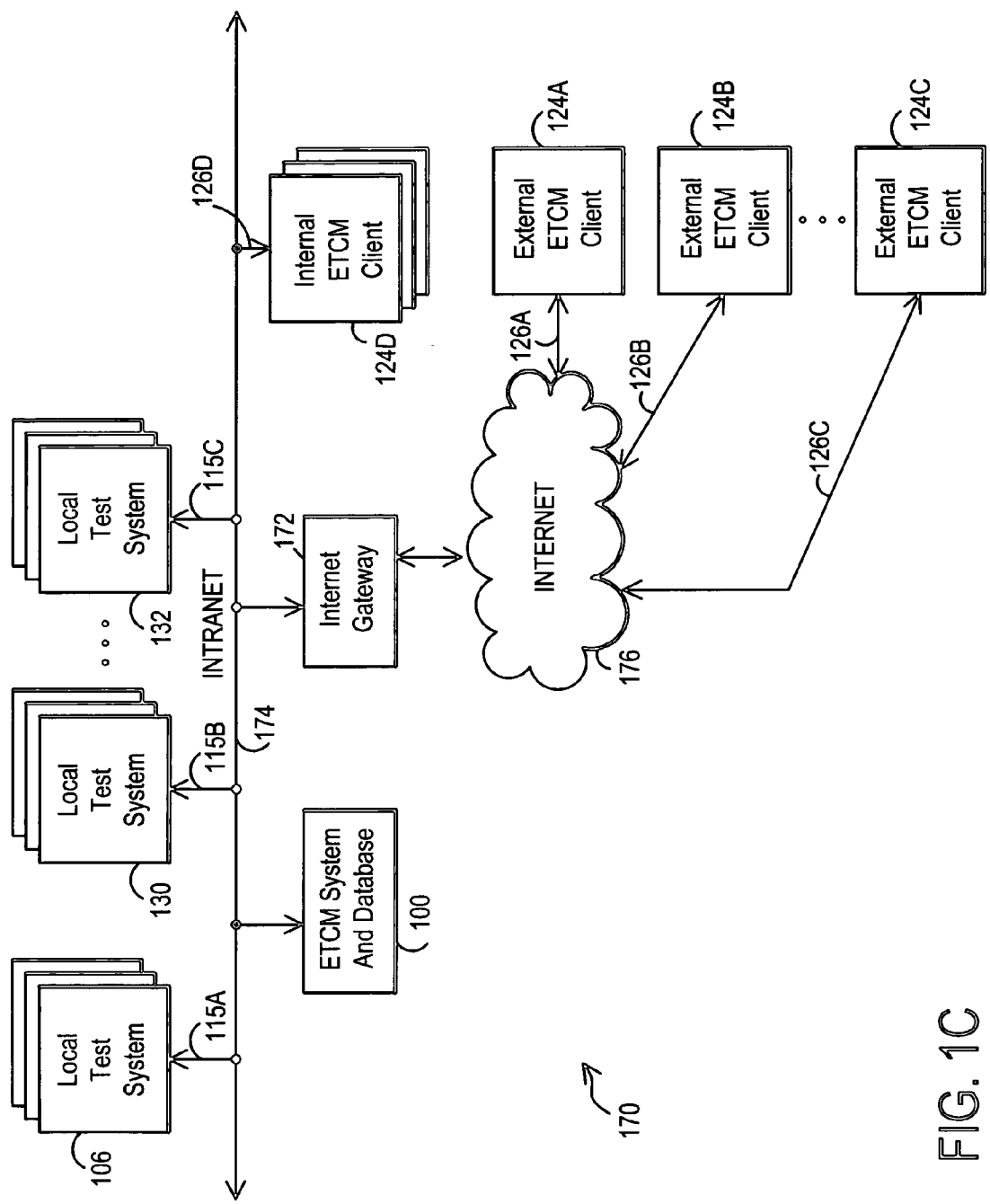
FIG. 1C is a block diagram for an enterprise environment including an ETCM system and database, according to the present invention.

FIG. 1C is a block diagram for an enterprise environment 170 that includes an ETCM system and database 100, according to the present invention. As depicted in this embodiment, the enterprise environment 170 includes a corporate intranet 174 to which are connected an Internet gateway 172 and the ETCM system and database 100. The enterprise environment 170 also includes a number of test sites represented by local test systems 106, 130 . . . 132 that are in communication with the intranet 174 through respective connections 115A, 115B . . . 115C. External ETCM clients 124A, 124B . . . 124C can communicate through the Internet 176 and the Internet gateway 172 to the intranet 174. In addition, internal ETCM clients 124D can communicate through the intranet 174 to the test systems and the ETCM system and database 100. Thus, the groups of test systems 106, 130 . . . 132, the ETCM system and database 100 and the ETCM clients 124A, 124B, 124C . . . 124D are all connected through a communication media. It is further noted that this example environment and communication infrastructure can be modified as desired. For example, the test systems could communicate with the ETCM system and database 100 through the Internet rather than through a corporate intranet. In addition, any of a variety of communication techniques may be used, including wireless connectivity.

As further described below, the ETCM system and database 100 allows users to manage test stations, test data, results and any other desired information for a group of test stations connected together through any of a variety of different media. The test stations do not need to be limited to certain type of testable devices (UUT) nor to how many devices can be tested in any period of time. The ETCM system enables users and other software programs to manage test stations from any remote location through a centralized data system. The ETCM system also allows the test station terminals to register and communicate with a centralized repository, thereby facilitating the transfer of test related information such as test data results, configuration, serial numbers, etc. The ETCM system and its components further provides programming interfaces to allow other devices and systems to connect and communicate with the ETCM system and its components. The ETCM system also provides graphical user interfaces (GUI) for operation and manipulation of the test information, test configuration and data management details, as well as any other desired test operation parameter.

It is further noted that the number of test stations can be divided and organized in different categories, which are fully configurable to the user's needs, and that the ETCM system can allow for the remote management of these test stations. In addition, these test stations can be distributed on a network inside a single building or can be distributed in any number of different locations around the world. The ETCM system of the present invention is not a factory execution system. Rather, it is a system that enables the management of test stations and related information as well as the management of test data. The stations can be distributed anywhere in the world and can be accessed through a computer terminal from anywhere where access to the central repository or database systems is available.

Management of test stations and test related information can include a variety of different capabilities to provide users and organizations with desirable and advantageous functionality. For example, test stations (or ATEs) may be organized in a logical way according to a customer's specific needs, independent of the physical location of the test stations. In addition, test station information, such as serial number, vendor, network settings, building location, department responsibility, etc., can be saved, retrieved and administered, either remotely or locally, as desired. Information can be set up to track test stations programmatically or through a graphical user interface. Changes to test station information can be scheduled so that these changes are made at a latter specific time and date. Changes can also be made to a single test station or to groups of test stations, depending upon customer needs or the manner in which the user chooses to configure test operations. Software versions and updates can also be monitored, controlled and remotely downloaded to test stations depending upon configurations or user input. Specific test configuration information can be retrieved and administered through the ETCM system, as well. This configuration information can include, for example, test plan configuration information (test plan name, author, last modified, available test stations, etc.), test step configuration information (name, properties, execution properties, etc.) and execution specific configuration information (start time, end time, calibration at execution, etc.). Test operations may also be configured to allow tracking of test related activities such as the test plan, test steps, and test execution, either programmatically or through a graphical user interface. Further, the test results can be collected, organized and analyzed. For example, what test data to collect can be configured based upon a selection of the test procedures and results to include. In addition, events can be configured, enabled and disabled so that if a particular event occurs, the system will execute a specific action, such as a notification to a responsible engineer when a test parameter meets some defined condition, such as the test parameter being equal to a selected value, the parameter being over or under a certain range, etc.

Figure 2A:
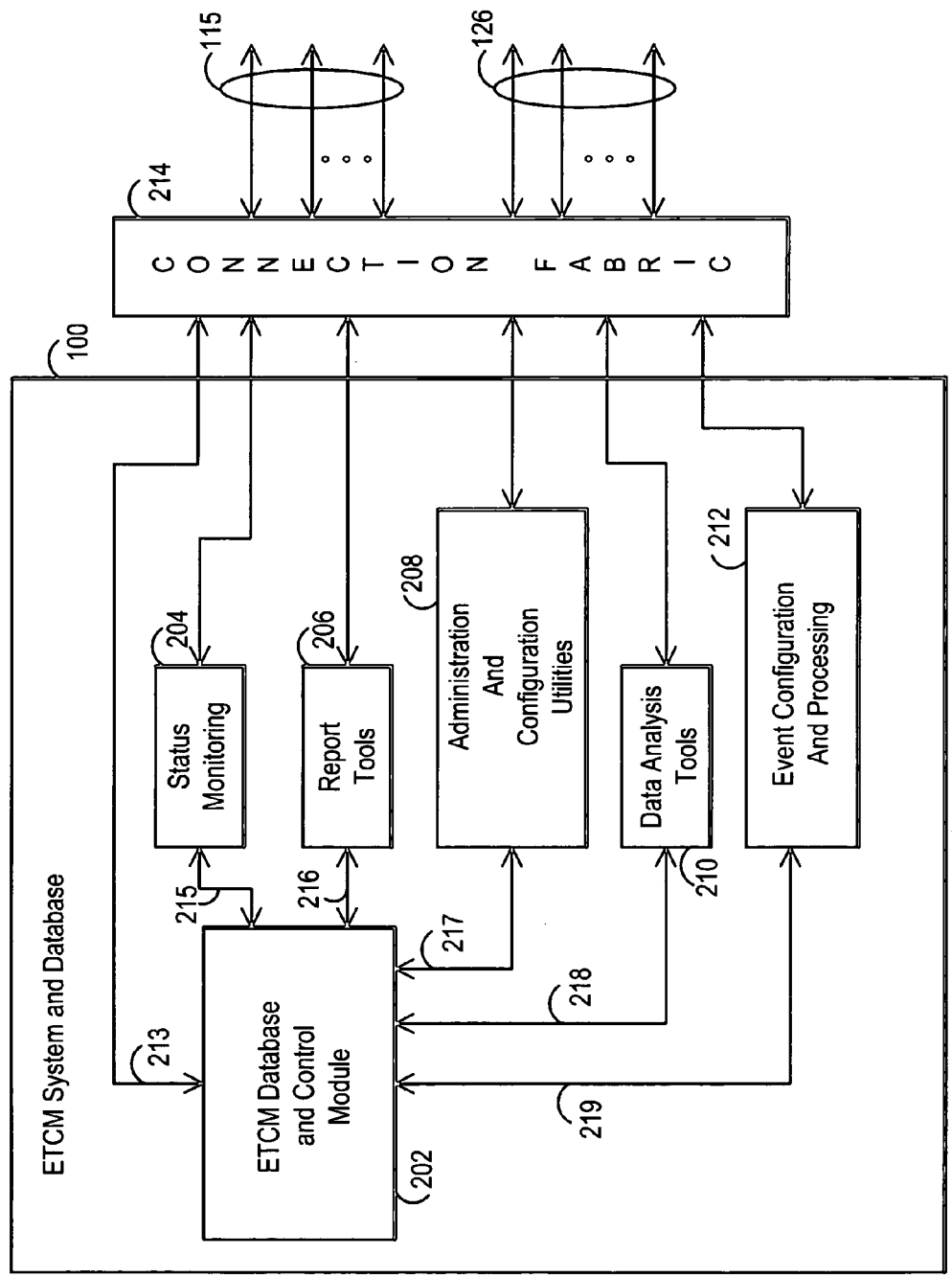
FIG. 2A is a block diagram for an ETCM system and database including various tools, modules and utilities connected through any desired connection media to test stations and ETCM clients, according to the present invention.

Looking now to FIG. 2A, a block diagram is depicted for the ETCM system and database 100, which includes various tools, modules and utilities connected through any desired connection media to test stations and ETCM clients, according to the present invention. In the embodiment depicted, the ETCM system and database 100 includes a status monitoring module 204, report tools 206, administration and configuration utilities 208, data analysis tools 210 and an event configuration and processing module 212. Each of these modules, tools and utilities 204, 206, 208, 210 and 212 are connected to the ETCM database and control module 202 through connections 215, 216, 217, 218 and 219, respectively. Each of these modules, tools and utilities 204, 206, 208, 210 and 212 are connected to connection fabric 214, and the ETCM database and control module 202 is connected to connection fabric 214 through connection 213. The collective connections 115 for the tests systems and the collective connections 126 for the ETCM clients are also connected to the connection fabric 214. The connection fabric 214 represents any of a variety of mechanisms and architectures for effecting the communication of information between different electronic devices.

The status monitoring module 204 operates on ETCM server systems that are part of the ETCM system and database 100 and can provide a variety of monitoring features that are accessible to the ETCM clients, including enabling a user to remotely monitor ATEs connected to the ETCM system, for example, by providing a remotely accessible hierarchical view of all the ATEs connected into the ETCM system and by providing the user access to more details about particular test stations or ATEs.

The report tools 206 operate on ETCM server systems that are part of the ETCM system and database 100 and provide a variety of reporting features that are accessible to the ETCM clients. For example, the report tools 206 can provide pre-configured reports to display to the user. It can also provide mechanisms for users to configure and create their own reports. These pre-configured and user configured reports can be generated from the information contained on the database server about the ETCM system in general or, more particularly, from information on the database server about specific test stations, devices, UUTs, etc. These reports can be generated and viewed as desired by the user.

The administration and configuration utilities 208 operate on ETCM server systems that are part of the ETCM system and database 100 and provide a variety of test and data administration and configuration features that are accessible to the ETCM clients. For example, the user can remotely create and modify configuration models and information about the ATEs. These accesses can also be done for individual ATEs or for groups of ATEs, as desired.

The data analysis tools 210 operate on ETCM server systems that are part of the ETCM system and database 100 and provide a variety of data analysis tools that are accessible to the ETCM clients. For example, data analysis tools can provide mechanisms to analyze the data gathered on the test stations. One such mechanism is to allow a user to view the trend in a particular value of all the units tested on selected test stations.

The event configuration and processing module 212 operates on ETCM server systems that are part of the ETCM system and database 100 and provides a variety of testing event notification features that are accessible to the ETCM clients. For example, this module 212 can allow the user to configure an event that gets triggered when a configured condition is met. For example, a user might want to be notified by email when more than a specified number of units (such as five units) have failed on a test station during a period of time. In this case, the user can configure the event through access to this module and the system will provide the corresponding notification.

Figure 2B:
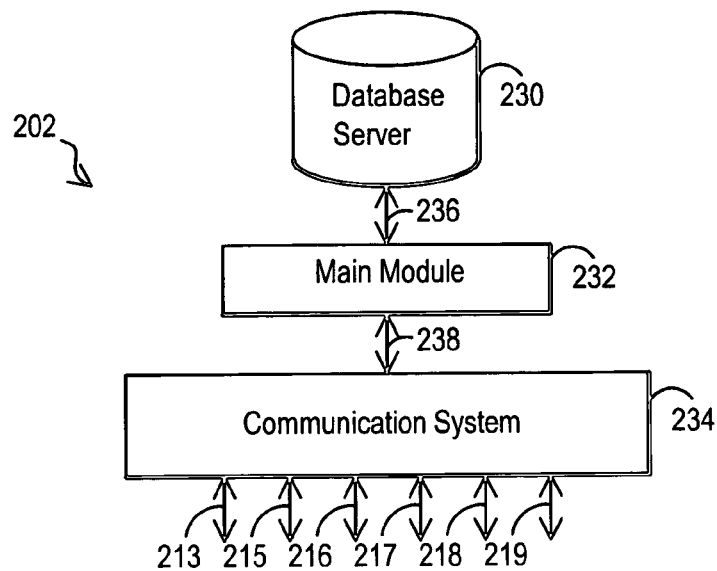
FIG. 2B is a block diagram for an ETCM database and control module including a main module and communication system that allow for transparent database access, according to the present invention.

FIG. 2B is a block diagram for an ETCM database and control module 202, which includes a main module 232, communication system 234 and database server 230, which communicate with each other through connections 236 and 238. In the embodiment shown, connections 213, 215, 216, 217, 218 and 219 correspond to the connections depicted in FIG. 2A.

The database server 230 provides the core database functions and can be, for example, a ORACLE database system available from Oracle, a DB2 database system available from IBM or an SQL SERVER database system available from Microsoft. For example, the database server 230 can be a centralized repository of information for the ETCM system. Stored information held by the database server 230 can include any desired information, such as information about each test station, about each test related to each test station, about the devices or units under test. As indicated above, reports generated through the ETCM system can be created as a result of querying the database server 230 for desired information. In short, the database server 230 stores the data utilized for the operation of the ETCM system and enables the efficient retrieval of this data when desired.

The main module provides an interface to the database server and thereby allows for relatively transparent database access by devices desiring to store or retrieve information from the database server 230. For example, the main module 232 can provide mechanisms to access the information contained in the database server and can allow a developer of the ATE to utilize the database without the overhead of learning and using SQL and database access techniques. The communication system 234 provides a connection for systems and modules communicating with the main module and may include various security measures, as desired.

Figure 2C:
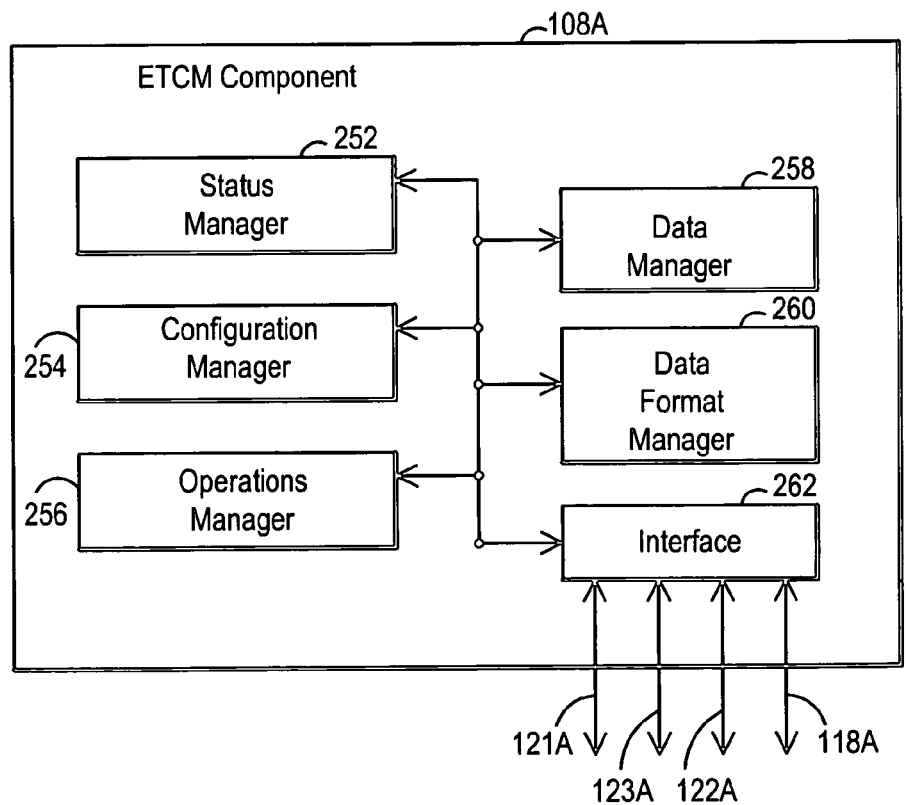
FIG. 2C is a block diagram for an ETCM component running on a local test station, according to the present invention.

FIG. 2C is a block diagram for an ETCM component 108A operating on a local test station 106A. The ETCM component 108A includes a status manager 252, a configuration manager 254, an operations manager 256, a data manager 258, a data format manager 260 and an interface 262. The interface 262 provides a communication link to other software or device operations, for example, through connections 121A, 123A, 122A and 118A, as discussed above. The status manager 252 operates to control, manage and track test status and ETCM status information (such as pass or fail, running, connected, scheduled, etc.). The configuration manager operates to control, manage and track test configuration information (such as test name, author, test steps, measurements, test sequences, etc) that can be communicated to and from the test software 112A and the test management software 110A. The operations manager provides general control and management functions for the operation of the ETCM component 108A. The data manager 258 provides control and management of test related data, such as input data and test result data. Examples of this data management are further discussed with respect to FIGS. 3A–3C below. The data format manager 260 operates to effect any data format changes or modifications that facilitate data communications between various software and hardware components that are connected to the ETCM component 108A. For example, data from the test software 112A may be in a pure, unstructured text string format. The data format manager 260 can modify this data so that it takes a format that can easily be incorporated into the database server 230 utilized by the ETCM system and database 100. In other words, if the database server 230 is an SQL Server database, the data being communicated to and from the test software 112A and/or the test management software 110A can be converted to and from an SQL Server format to the particular data format expected and/or utilized by these other software components. It is also noted that data format modifications and conversions can be accomplished, in whole or in part, as part of the operations of the ETCM system and database 100, if desired, such that data from the test software 12A can be in a format different for the format desired for use with the database server 230.

Figure 3A:
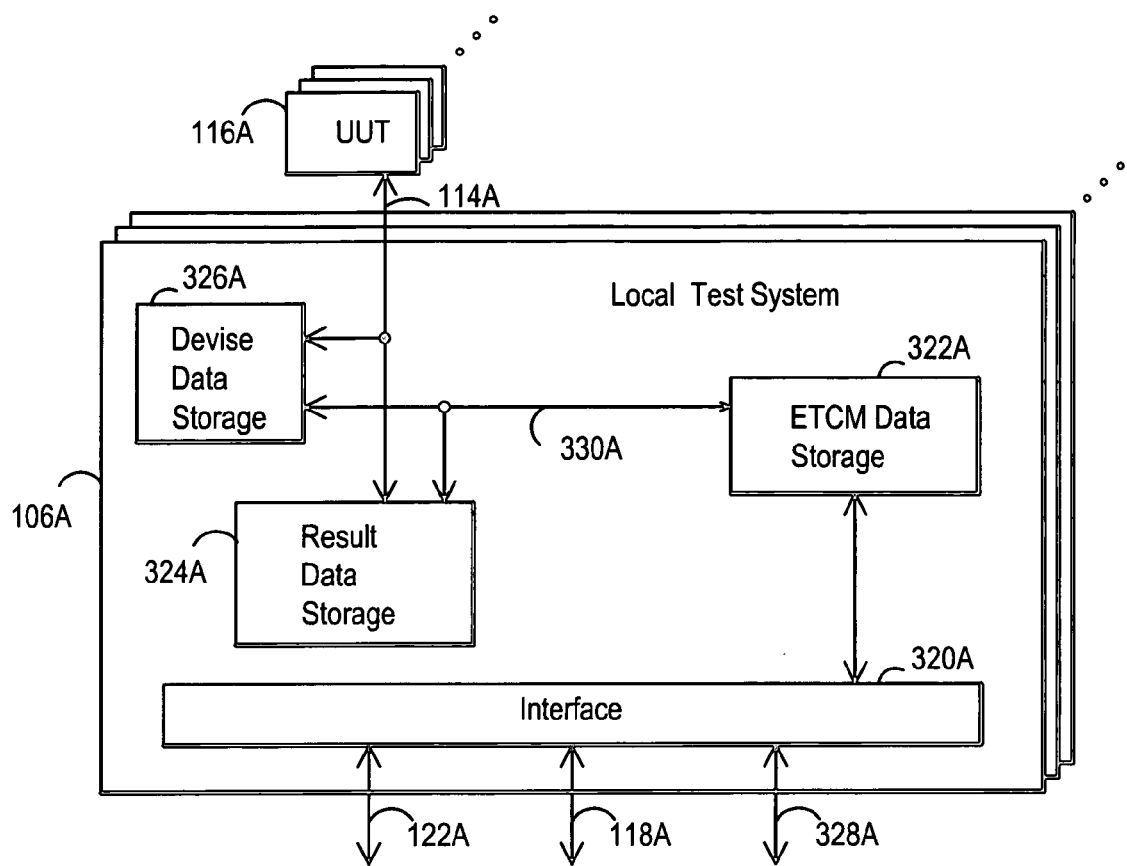
FIG. 3A is a block diagram of data flow for a local test system that includes an ETCM module according to the present invention.

FIG. 3A is a block diagram of example data flow for local test systems that include ETCM components according to the present invention. As depicted, a number of local test systems and associated UUTs can be part of the enterprise test and management system. A representative data flow is shown for local test system 106A. Interface 320A provides a communication interface for the transfer of information and data between the local test system 106A and external devices and systems. For example, connection 122A corresponds to the connection in FIG. 1B to the raw data archival system 102, and connection 118A corresponds to the connection in FIG. 1B to the ETCM system and database 100. In addition, connection 328A represents other control and/or data information that may be communicated to and from the local test station 106A. As discussed above, the ETCM module 108A within the local test system 106A controls the flow of data. The device data storage 326A and the result data storage 324A are connected to the UUT 116A and to the ETCM data storage 322A. The device data storage 326A represents local storage of test related data and data relating to the device being tested or the UUT. The result data storage 324A represents local storage of data relating to test results. The ETCM data storage 322A represents storage of data relating to ETCM activities. It is noted that data can be stored in any desired manner, according to the present invention, as long as an ETCM module is present to control, at least in part, the flow of data.

Figure 3B:
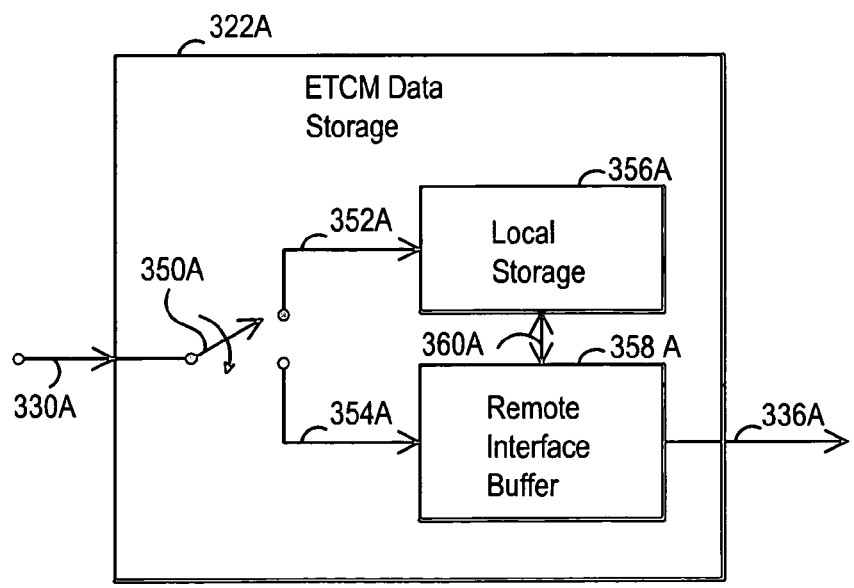
FIG. 3B is a block diagram of a selectable local/remote data path for ETCM data storage, according to the present invention.

FIG. 3B is a block diagram of a selectable local/remote data path for ETCM data storage 322A. As discussed above with respect to FIG. 1A (prior art), conventional test data management techniques did not address active configuration and management of enterprise-wide test operations. The ETCM module of the present invention provides this capability. As part of this operation, the ETCM data storage 322A allows for data to be sent remotely from the local test system in a variety of ways. For example, if an external connection to a remote device is operable, the data on line 330A coming into the ETCM data storage 322A can be immediately transmitted along line 354A to a remote interface buffer 358A and out line 336A to the remote device. Also, if an external connection is not active, the data on line 330A coming into the ETCM data storage 322A can be transmitted along line 352A to be stored in local ETCM storage 356A for later transmission, when an external connection is active, along line 360A to the remote interface buffer 358A and out line 336A to the remote device. The switch or selection block 350A provides the ability to select between these paths depending upon the availability of an external connection.

Figure 3C:
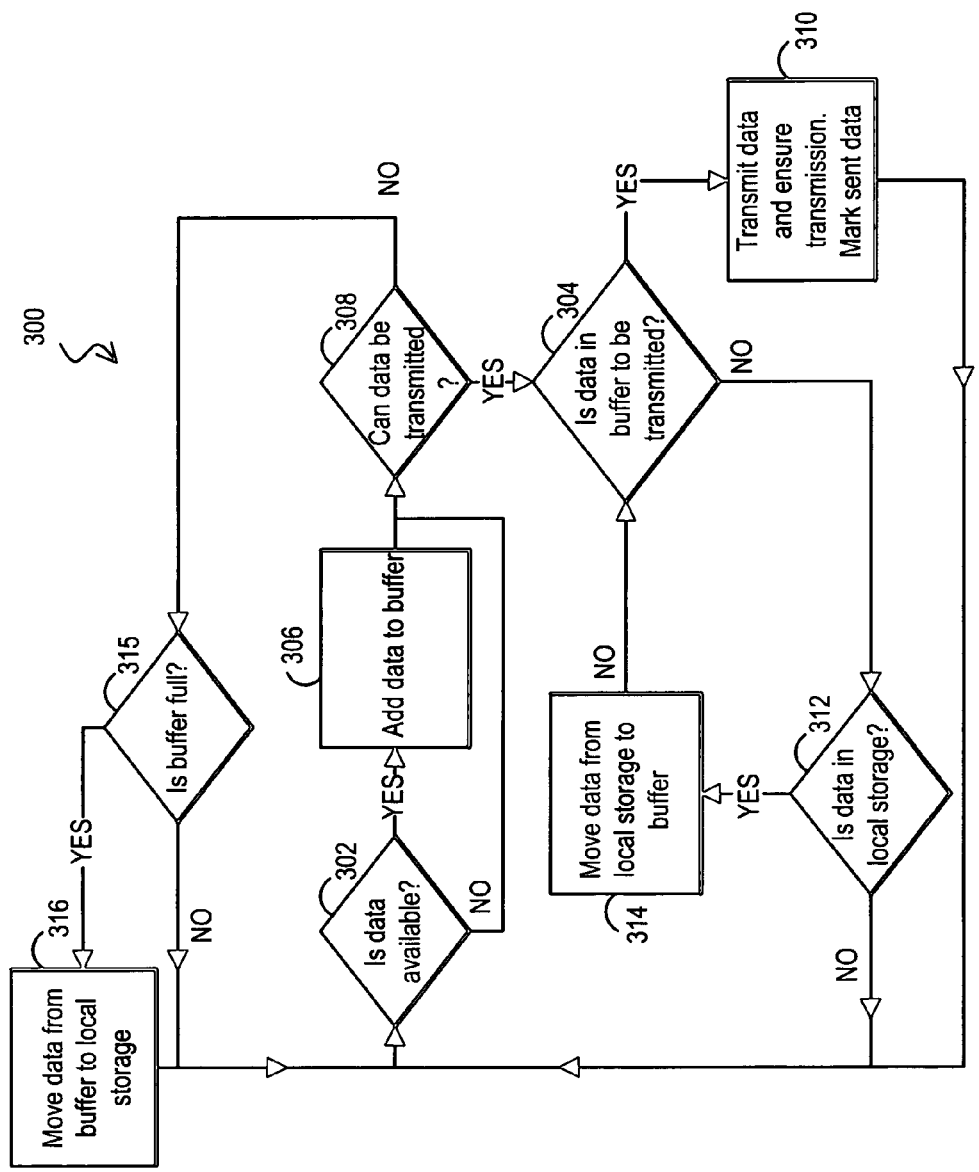
FIG. 3C is a flow diagram for data flow associated with the selectable local/remote data path for ETCM data storage, according to the present invention.

FIG. 3C is a flow diagram for data flow 300 associated with the selectable local/remote data path for ETCM data storage, according to the present invention. Starting first with decision block 302, the ETCM module data flow transmission process determines if result test data is available. If "yes," the data is added to the transmission interface buffer 358A in block 306. In decision block 308, the ETCM module data flow transmission process determines if a connection is active so that data can be transmitted. If "yes," then control passes to block 304 where a determination is made whether there is data in the buffer to be transmitted. If "yes," then the data is transmitted in block 310. In addition, the sent data can be marked as sent, and the process can ensure data transmission, for example, through a data valid and received acknowledgement from the receiving device. Flow then proceeds back to block 302. If the determination in decision block 308 is "no," decision block 315 is reached in which a determination is made whether the interface buffer 358A is full. If the answer is "no," flow proceeds back to block 302. If the answer is "yes," then the data is moved to the local ETCM data storage 322A in block 316.

Looking back to decision block 302, if the answer is "no" and data is not currently available for transmission, the ETCM module data flow transmission process proceeds to decision block 308 to determine if data can be transmitted. If the answer is "no," control proceeds on to decision block 315. If "yes," flow proceeds on to block 304 to determine whether there is data in the remote interface buffer 358A that is ready for transmission. If "yes," flow proceeds to block 310. If "no," flow proceeds to decision block 312 where the ETCM module data flow transmission process determines whether there is data stored in the local ETCM data storage 322A. If "yes," data is moved from the local ETCM data storage 322A to the remote transmission interface buffer 358A in block 314, and flow proceeds back to decision block 304. If "no," flow proceeds back to decision block 302.

Figure 4A:
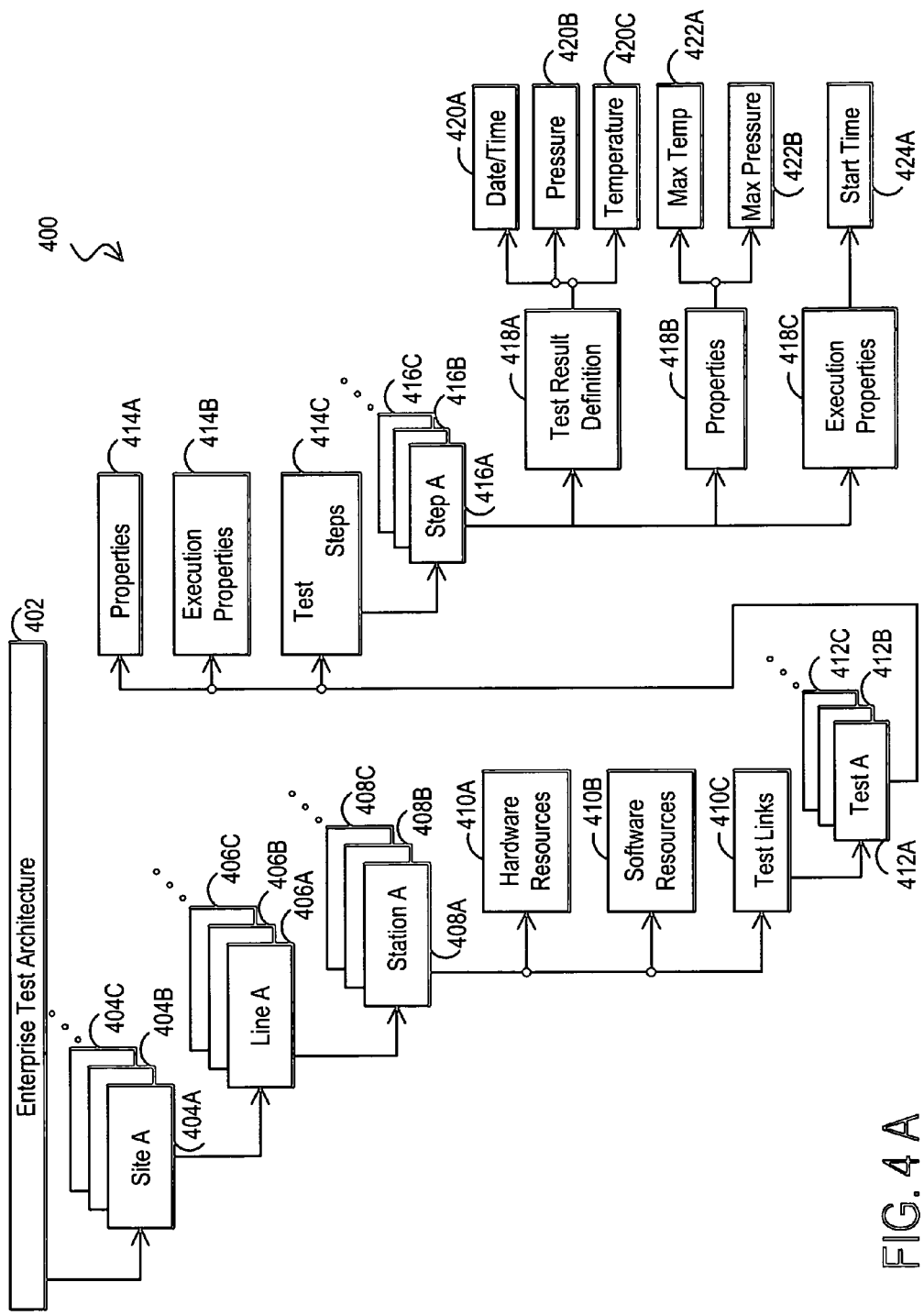
FIG. 4A is a block diagram for an ETCM control architecture that allows monitoring and management of a plurality of test sites that each having a plurality of test lines or floors that each in turn have a plurality of test systems and associated hardware, software and test parameters.

FIG. 4A is a block diagram for an example ETCM control architecture that allows monitoring, configuration and management of a plurality of test sites that each having a plurality of test lines or floors that each in turn have a plurality of test systems and associated hardware, software and test parameters. This ETCM architecture 400, for example, may be provided through a graphical user interface (GUI) that allows manipulation of enterprise-wide test configuration and data management. Block 402 represents the overall enterprise test architecture under which a tree-like control structure is organized. This tree-like structure can be created, modified and configured by a user logged into the ETCM system and database. In the example depicted, items 404A (SITE A), 404B, 404C, . . . represent different test sites which may be, for example, at different geographic locations. Items 406A (LINE A), 406B, 406C, . . . represent different test lines or floors that may exist at any given test site, such as test site 404A (SITE A). Similarly, items 408A (STATION A), 408B, 408C, . . . represent different test stations or ATEs that may exist for any given test line, such as test line 406A (LINE A).

For each such test station 408A (STATION A), additional information may be provided, such as hardware resources 410A, software resources 410B and test links 410C to tests 412A (TEST A), 412B, 412C . . . , which may in turn represent, for example, tests that can be run or are running on the test stations, such as test station 408A (STATION A). For each test, such as test 412A (TEST A), additional test related information can be provided. This information can include items such as general test properties 414A, test execution properties 414B, and test steps 414C that links to individual test steps 416A (STEP A), 416B, 416C, . . . for the test. Each test step, such as test step 416A (STEP A) can have still additional information linked to it such as test result definition 418A with parameters such as date/time 420A, pressure 420B and temperature 420C; properties 418B with parameters such as maximum temperature 422A and maximum pressure 422B; and execution properties 418C such as start time 424A. In addition to the example control, configuration and management information provided in FIG. 4A, other information and related links can be provided, as desired, through the enterprise test architecture 402.

This control architecture 400 and associated interface allows users, if desired, to monitor, configure and manage enterprise test facilities from a single point as those operations are occurring. Information may be viewed and modified to generate any desired view of the test facilities and operations for the company. In addition, tests on particular test stations can be monitored, manipulated, configured, etc. as desired through the user interface. For each of the items in FIG. 4, for example, the user can add, delete or modify the item, its location in the tree, and/or the parameters associated with the item. In addition, the user can organize the information as the user desires, similar to a file folder structure in as typical with file handling in personal computer operating systems, such as WINDOWS 95/98 available from MICROSOFT. Thus, the actual, current operations of the test stations can be managed, configured and controlled from a remote location through access to a centralized database.

Thus, from one interface, a user may determine the current status of enterprise-wide test operations and view these operations on increasing or decreasing levels of detail, as desired, through the tree-like interface structure. In addition, an indication at each level may be provided for status events, such as "green" for operations within desired parameters, "yellow" for operations within concern levels and "red" for operations that have either stopped or are threatening production or product yield. In this way, an engineer or test operations manager can quickly monitor, configure and manage test operations through a remotely accessible ETCM system and database. This feature provides a way to evaluate the current status of the test operations from one point, thereby providing the ability to make better decisions. In other words, the person reviewing or managing the test operations does not need to be at the same facility to view the ETCM information. In addition, because this access can be accomplished remotely, companies that have a distributed manufacturing environment, for example, different steps of the production line are located at different locations, can use this interface tool to enable personnel to access, monitor and evaluate production line operations as a whole from one point.

Figure 4B:
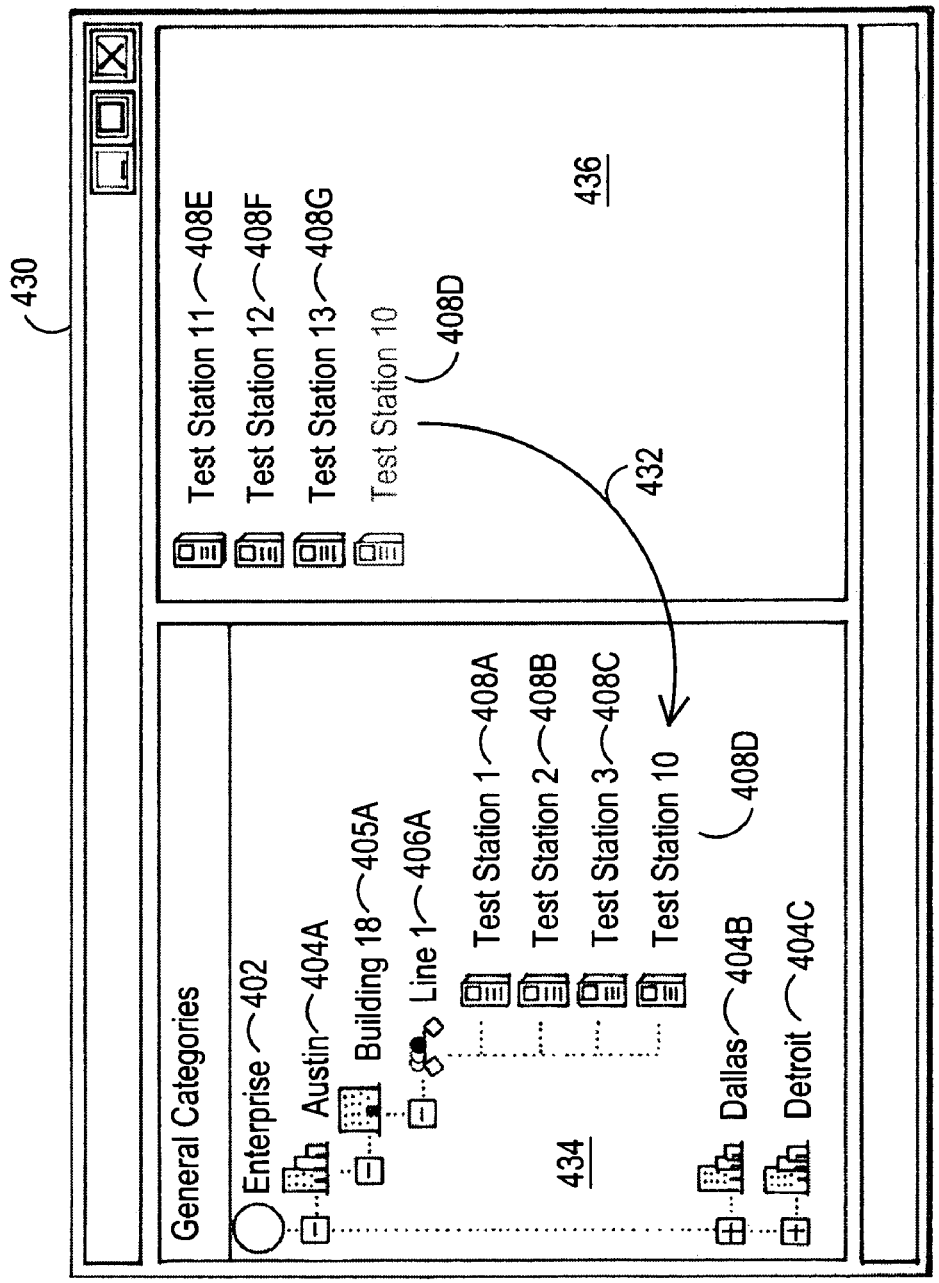
FIGS. 4B, 4C and 4D are example graphical user interfaces for portions of the tree-like test configuration and data management structure depicted for the enterprise test architecture in FIG. 4A, according to the present invention.
Figure 4C:
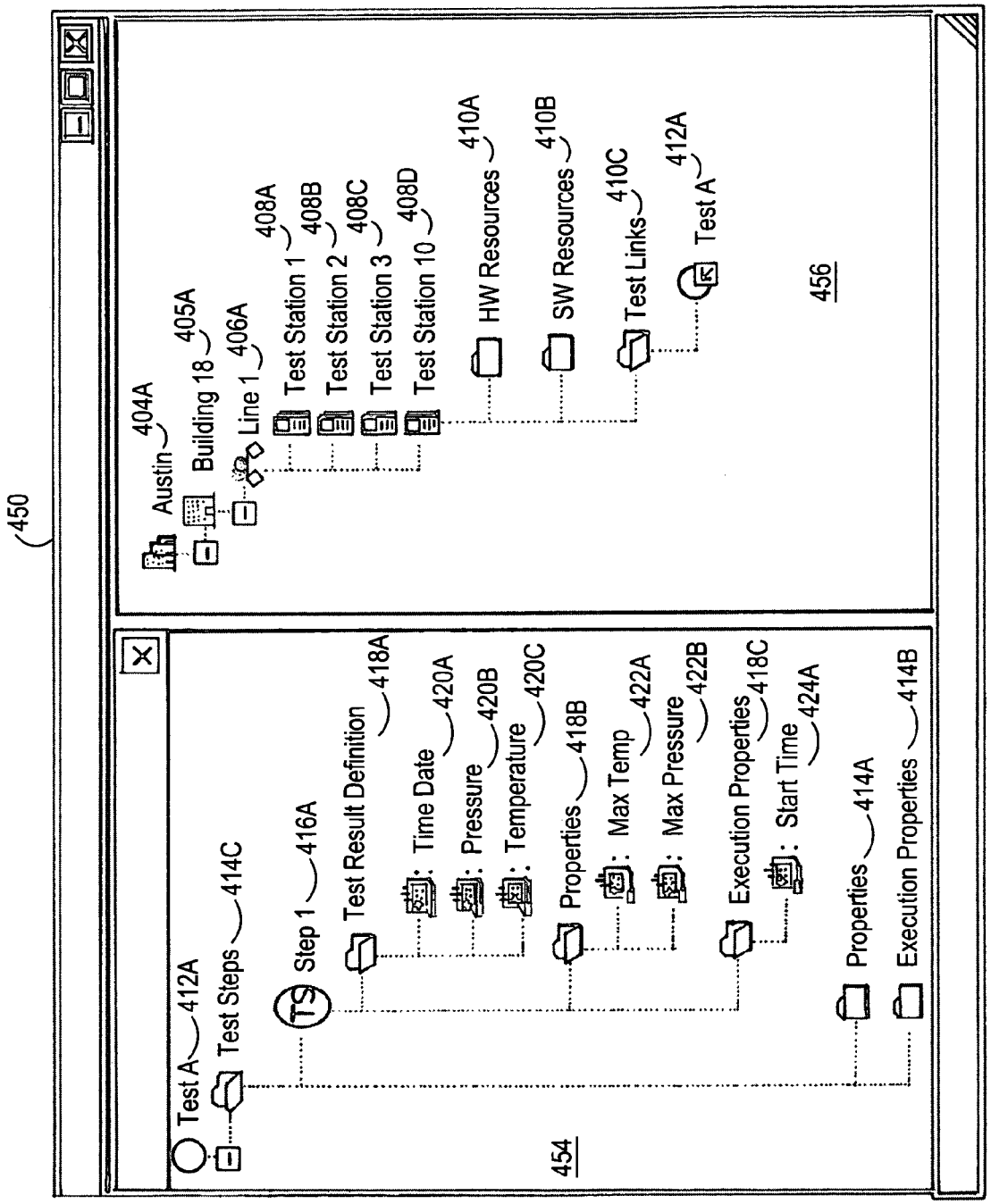
Figure 4D:
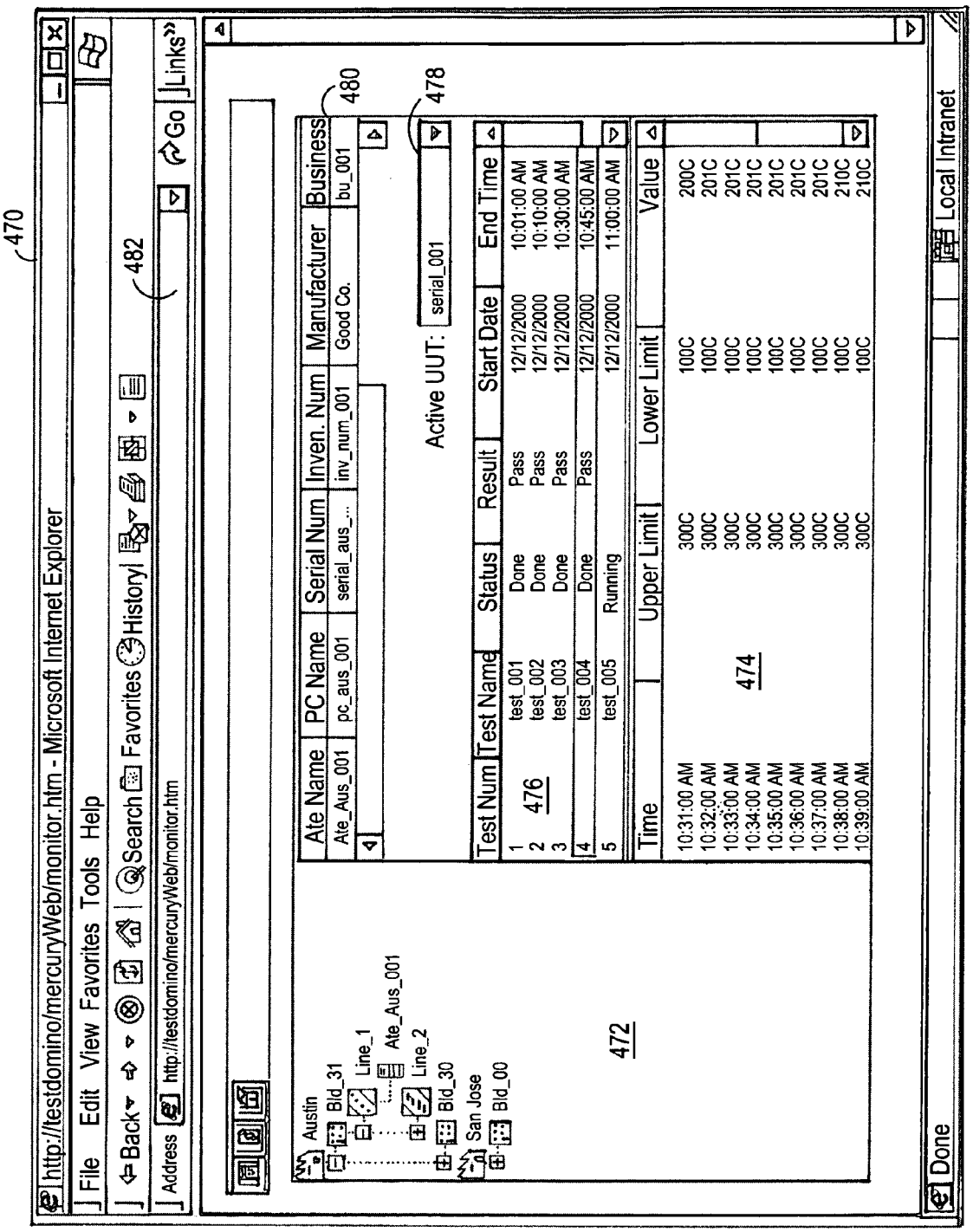

FIGS. 4B, 4C and 4D provide example graphical user interfaces (GUIs) for portions of the tree-like test configuration and data management structure depicted for the enterprise test architecture in FIG. 4A. Looking first to FIG. 4B, a "window" interface with a tree-like selection structure is depicted, for example, similar to those used by the MICROSOFT 95/98 operating system available from MICROSOFT. Within the window 430, there are a number of items related to enterprise test operations that correlate to those in FIG. 4A. As depicted, these items are separated into a "General Categories" portion 434 that includes an enterprise test operations architecture tree and portion 436 that includes a list of test stations that can be allocated or configured to be part of the architecture tree. More particularly, in portion 434, the enterprise 402 includes three test operation sites, namely the Austin site 404A, the Dallas site 404B and the Detroit site 404C. Again as depicted, the user has selected the Austin site 404A to reveal its sub-categories in the tree-like structure. Similarly, Building18 405A (part of an additional layer to those depicted in FIG. 4A) has been selected, as has Line1 406A. Within Line1 406A are TestStation1 408A, TestStation2 408B, TestStation3 408C and TestStation10 408D. In portion 436, three test stations are listed TestStation11 408E, TestStation12 408F and TestStation13 408G. The fourth listed test station TestStation10 408D is grayed. Line 432 indicates that the user has selected and moved this TestStation10 408D from the test station list in portion 436 to be included within the Line1 406A portion of the architecture tree. Using a computer GUI, this move operation, for example, may be effected by a click and drag operation with a mouse or through the use of other standard techniques as would be known in the art for GUIs.

FIG. 4C depicts a GUI that provides further levels of details concerning test operations and configuration. Within the window 450, there are a number of items related to enterprise test operations that correlate to those in FIG. 4A. These items are separated into portion 456 that includes an architecture tree of test operations in the Austin site 404A and portion 454 that includes an architecture tree related to TEST A 412A. Within portion 456, the same information related to the Austin site 404A has been selected for display as is shown in FIG. 4B with the addition of information related to TestStation10 408D. Sub-information under TestStation10 408D includes Hardware (HW) Resources 410A, Software (SW) Resources 410B and Test Links 410C, which has further been selected to reveal TEST A 412A. Looking to portion 454A, additional information is displayed concerning TEST A 412A including Properties 414A, Execution Properties 414B and Test Steps 414C, which has also been selected to show information related to TestStep1 416A. This information includes TestResultDefinition 418A (with sub-information TimeDate 420A, Pressure 420B and Temperature 420C), TestProperties 418B (with sub-information MaxTemp 422A and Max Pressure 422B) and TestExecutionProperties 418C (with sub-information StartTime 424A). As stated above, the GUI can allow creation operations, click and drag operations, selection operations and other operations consistent with window and tree architecture operations that are common to GUI based environments, such as used by the WINDOWS 95/98 operating system.

FIG. 4D depicts a GUI that provides test execution related information for enterprise test operations through a network browser. Window 470 provides an example of a standard GUI interface as may be displayed through INTERNET EXPLORER available from Microsoft. As with the other GUIs, a pointer device, such as a mouse and/or a keyboard, can be used to navigate the interface. The "address" space 482 provides a data input field to provide the web site or network address for test monitoring access. The space 472 provides a similar tree structure to that discussed with respect to FIGS. 4A and 4B above, with the test stations in FIGS. 4A and 4B corresponding to ATEs in FIG. 4D, such as ATE_AUS_001. The space 480 provides detailed information concerning the particular ATE, for example, ATE name, PC name, serial number, inventory number, manufacturer, business unit, etc. Thus, space 480 can be used to provide any desired information related to the ATE and relate devices, systems and software that are being utilized for device testing. The space 478 provides information concerning the device or unit-under-test (UUT) that is being monitored or accessed, such as SERIAL_001 as shown in FIG. 4D. The space 476 provides information concerning the tests that are being run on the UUT, for example, Test Number, Test Name, Status, Result, Start Date, End Time, etc. Thus, space 476 can be used to provide any desired information related to the test being utilized for device testing. The space 474 provides information concerning the particular test, for example, Time tag, Upper Limit allowed, Lower Limit allowed, actual test Value, etc. As with the other spaces, this space 474 can be used to provide access to any desired information relating to the selected item.

Figure 5:
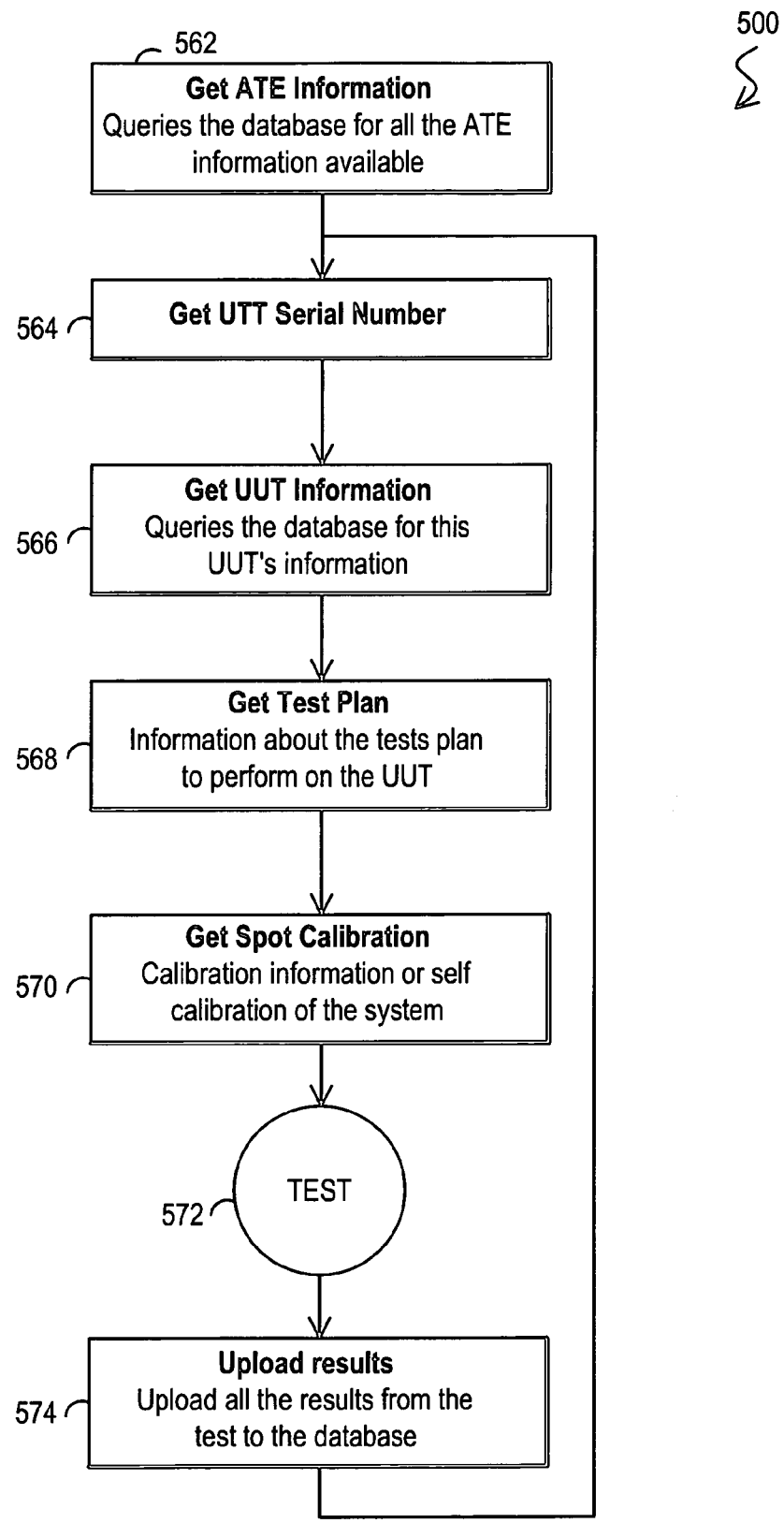
FIG. 5 is a flow diagram for test cycle flow diagram for automated test equipment (ATE) or test systems that include an ETCM module, according to the present invention.

FIG. 5 is a flow diagram for test cycle flow diagram for automated test equipment (ATE) or test systems that include an ETCM module, according to the present invention. The ATE test cycle process 500 starts with block 562 where the ETCM component 108A queries the ETCM system and database 100 to obtain all information for the ATE that is available in the ETCM database. This ATE information is utilized to configure and operate the ATE to conduct testing of the UUT. In block 564, serial number information for the UUT is obtained. In block 566, the ETCM component 108A queries the ETCM system and database 100 to obtain all information for the UUT that is available in the ETCM database. Next, in block 568, the ETCM component 108A queries the ETCM system and database 100 to obtain test plan information for the UUT. In block 570, calibration information is obtained, or self calibration of the ATE system is executed. The test for the UUT is executed in block 572 after which the test results are transmitted or uploaded in block 574 to the ETCM system and database 100, for example, as described above with respect to FIGS. 3A–3C. It is noted that in querying the central database for information, data modified by a user who is logged into the ETCM system and database 100 can be given effect. This data can then be updated onto the test stations. This tool, therefore, can not only make sure that the test data and configuration information is available for the test station, depending on how the test station has been developed, this tool can also react to the change of information in a variety of different ways.

Figure 6:
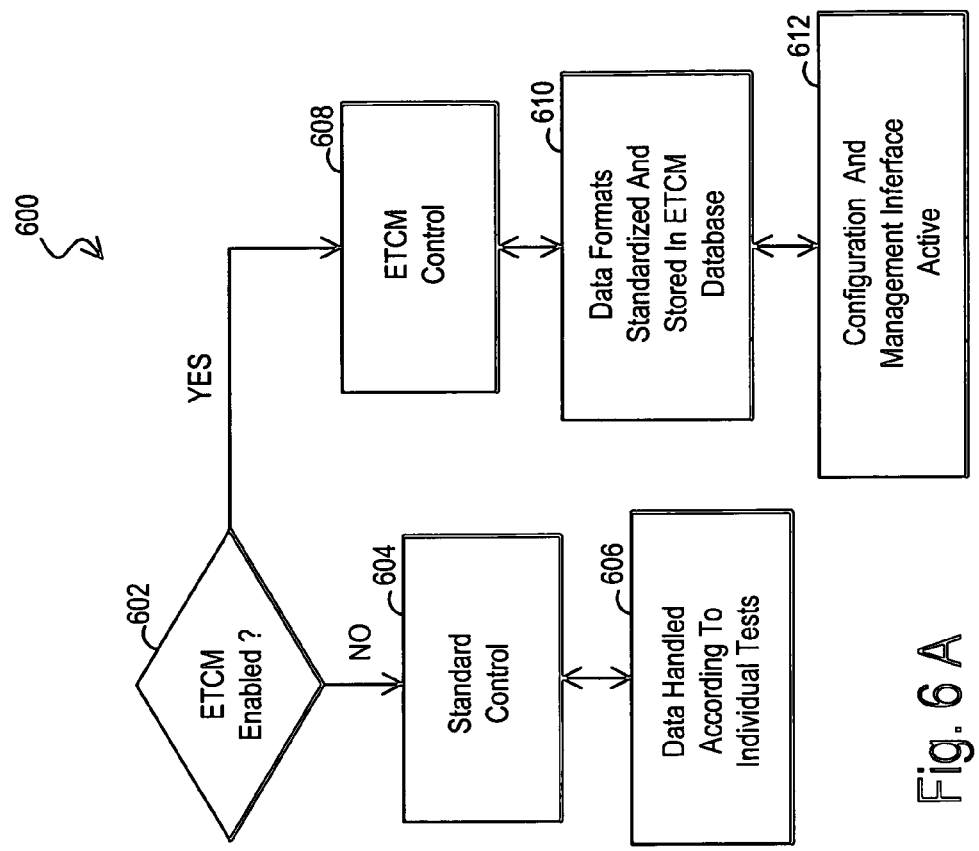
FIG. 6A is a flow diagram for selectively choosing whether ETCM control is used with respect to test software installed and operating on a local test station, according to the present invention.
FIG. 6B is a block diagram for a local test station having an ETCM enable module that may be set to enable or disable processing by the ETCM component, according to the present invention.
Figure 6:
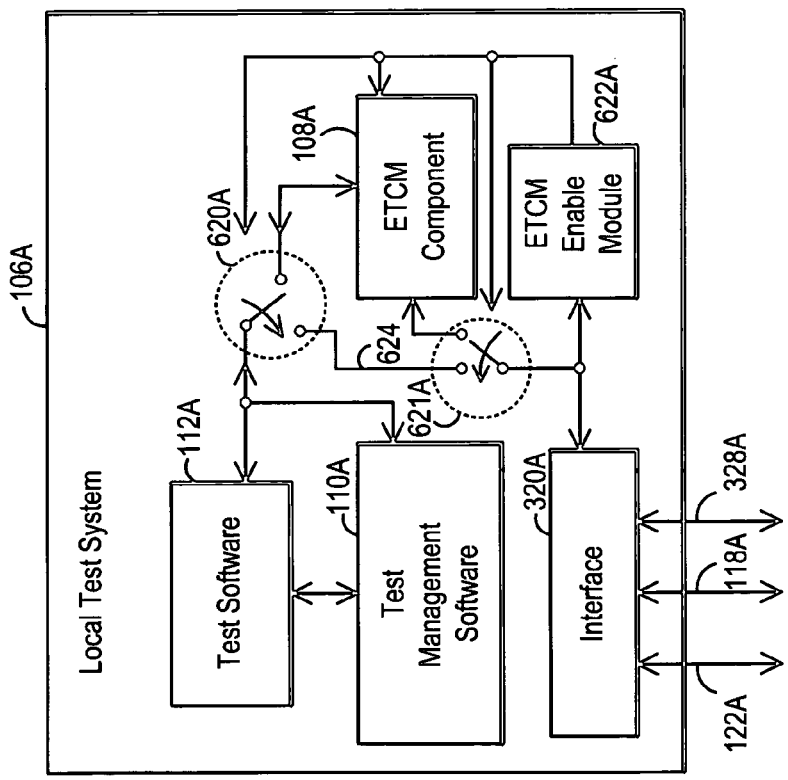

FIG. 6A is a flow diagram for selectively choosing whether ETCM control is used with respect to test software installed and operating on a local test station. Process 600 provides for processing with or without the ETCM component. Decision block 602 determines whether ETCM processing is enabled or not enabled. If the answer is "no," standard control block 604 acts to control test activities according to the software installed on the local test station. Block 606 represents that data is handled according to individual tests running on the local test stations. Thus, there is no standardized data format and there is no centralized data storage in a readily accessible database system. If the answer is "yes," however, ETCM control occurs in block 608. As indicated in block 610, data formats from disparate test stations are standardized and stored in a centralized ETCM database. In addition, as indicated in block 612 an ETCM configuration and management interface becomes active allowing for remote users to log onto the ETCM servers and the configure and manage test activities, for example, through an Internet connection and a browser program.

FIG. 6B is a block diagram for a local test station 106A having an ETCM enable module 622A that may be set to enable or disable processing by the ETCM component 108A. The interface 320A provides access from external devices to the local test station 106A. The test software 112A and the test management software 110A are traditionally designed, installed and operated to conduct a particular desired test of a UUT. As discussed above, the ETCM component 108A allows for advantageous management of test data activities. The connection 122A is connected raw data archive system 102, and connection 118A is connected to the ETCM system and database 100, as depicted in FIG. 1B. The connection 328A is provided for other device operation interactions, as shown in FIG. 3A. The ETCM module 622A is accessible through the interface 320A and allows selective enabling or disabling of the ETCM component 108A. When ETCM control is enabled, the switches 620A and 621A are set to allow information to pass through and be controlled by the ETCM component 108A. When ETCM control is disabled, the switch 620A and 621A are set so that information passes along line 624 so that the information bypasses and is not controlled by the ETCM component 108A.

The switch 620A, the switch 621A and the ETCM enable module 622A may be any desired technique for selectively enabling processing by an ETCM component of a test station. For example, the ETCM component 108A may be software-based processing that is installed as part of the test software. The ETCM enable module 622A and the switches 620A and 621A may essentially be a software switch that is set through the interface 320A. This software switch may determine whether or not the ETCM component installed on the test station 106A operates. In addition, the ETCM enable module 622A and switch 620A could be implemented through a software patch that is installed and executed on the test station 106A at a later date.

Advantageously, the ability to selectively enable the ETCM component 108A provides significant flexibility in test installations and operations. For example, if a company does not have the connectivity infrastructure to effect the transmission of information from a test floor where the test stations are located, the company can still include the ETCM component 108A in a software installation on the local test station 106A. In this way, when the connectivity infrastructure is constructed in the future, the ETCM component 108A can be enabled with little additional effort. Other advantageous uses of this selectivity are also situations where the connectivity infrastructure is in place, but the company nevertheless chooses not to utilize the ETCM control. In addition, even if the connectivity infrastructure is not in place, the ETCM control may be enabled, leading to data storage in the ETCM data storage 322A, as discussed with respect to FIGS. 3A–3C. In this way, for example, standardized data can be offloaded manually from the local test station 106A through interface 320A and then transferred to the ETCM system and database 100, if desired. In short, this selective enabling provides significant flexibility and efficiency advantages.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

What is claimed is:

1. An enterprise test data management system, comprising:
   a plurality of test systems having communication interfaces and configured to operate test software to conduct at least one test on a device in order to obtain test result data associated with that device, at least two of the test systems being directed to different test operations;
   data management software components configured to operate on the test systems and to automatically communicate test result data through communication interfaces for the test systems;
   a database configured to store the test result data related to test operations of the plurality of test systems; and
   a server system coupled to the database and configured to communicate with the plurality of test systems to receive the enterprise test result data through operation of the data management software components on the plurality of test systems;
   wherein the server system comprises a main module configured to receive data requests, to communicate with the database using the database protocol and to respond to the data requests.

2. The enterprise test data management system of claim 1, wherein the server system further comprises an interface configured to be accessible to remote users and wherein data requests comprise data requests from remote users.

3. The enterprise test data management system of claim 2, wherein the interface comprises links to information concerning the plurality of test systems, the links allowing information associated with the test systems to be viewed, configured and managed.

4. The enterprise test data management system of claim 1, wherein the server system is remotely accessible by user systems and is configured to allow access to the test data in the database.

5. The enterprise test data management system of claim 4, wherein the user systems are configured to use a graphical user interface to configure and manage the test data.

6. The enterprise test data management system of claim 1, wherein the test software is configured to conduct a plurality of tests on a device and wherein the test systems are further configured to operate test management software to manage execution of the tests.

7. The enterprise test data management system of claim 1, wherein the data management software component stores test data on the test systems if a connection to the server system is not active.

8. The enterprise test data management system of claim 1, wherein the test software operates to store the test data in a first format and the data management software operates to transmit the test data in a second format to the server system, the second format being compatible with the database protocol.

9. A method for managing enterprise test data, comprising:
operating data management software components on a plurality of enterprise test systems, each of the test systems being configured to operate test software to conduct at least one test on a device and to produce test result data, and wherein at least two of the test systems being directed to different test operations;
automatically communicating the test result data through communication interfaces for the test systems utilizing the data management software components;
utilizing a server system to communicate with the plurality of test systems to receive the test result data from the test systems through operation of the data management software components on the plurality of test systems; and
storing the enterprise test result data from the test systems in a database;
wherein the server system comprises a main module configured to receive data requests, to communicate with the database using the database protocol and to respond to the data requests.

10. The method of claim 9, further comprising providing a remote user interface coupled to the server system.

11. The method of claim 10, wherein the interface comprises links to information concerning the plurality of test systems, the links allowing information associated with the test systems to be viewed, configured and managed.

12. The method of claim 11, wherein the linked information comprises test data from the test systems.

13. The method of claim 9, further comprising storing test data on the test systems if a connection to the server system is not active.

14. The method of claim 9, further comprising utilizing the data management software to transmit test data in a desired format and to convert test data to the desired format, if necessary.

15. An enterprise test data management system having a remotely accessible interface, comprising:
a plurality of test systems configured to operate test software to conduct at least one test on a unit-under-test (UUT) in order to obtain enterprise test result data associated with that UUT, at least two of the test systems being directed to different test operations;
data management software components configured to operate on the test systems and to automatically communicate test result data through communication interfaces for the test systems;
a database configured to store test configuration data and the enterprise test result data related to the plurality of test systems;
a server system coupled to the database and configured to communicate with the plurality of test systems to send test configuration data to the test systems and to receive test result data from the test systems through operation of the data management software components on the test systems, the server system further comprising a main module configured to receive data requests, to communicate with the database using the database protocol and to respond to the data requests; and
an interface operable with the server system to provide access by remote user systems to the test configuration data and the enterprise test result data stored in the database.

16. The enterprise test data management system of claim 15, wherein the remote user systems are configured to use a graphical user interface to access and modify the test configuration data.

17. The enterprise test data management system of claim 16, wherein operation of the test systems are configured to be affected by modifications made to the test configuration by the user systems.

18. A method for managing enterprise test data, comprising:
operating data management software components on a plurality of enterprise test systems, each of the test systems being configured to operate test software to conduct at least one test on a device and to produce enterprise test result data, and wherein at least two of the test systems being directed to different test operations;
automatically communicating the test result data through communication interfaces for the test systems utilizing the data management software components;
utilizing a server system to communicate with the plurality of test systems to receive the enterprise test result data from the test systems through operation of the data management software components on the plurality of test systems;
storing the enterprise test result data from the test systems in a database; and
utilizing an enable module accessible through the interface and operable with the test software and the data management software component to selectively enable or disable operation of the data management software.

19. The method of claim 18, wherein the enable module comprises a software switch accessible through the interface of the test systems.

20. The method of claim 19, further comprising utilizing test management software to manage execution of the test on the device.

21. An enterprise test data management system, comprising:
- a plurality of test systems configured to operate test software to conduct at least one test on a device in order to obtain test result data associated with that device, at least two of the test systems being directed to different test operations;
- data management software components configured to operate on the test systems and to automatically communicate test result data through communication interfaces for the test systems;
- a database configured to store the test result data related to test operations of the plurality of test systems; and
- a server system coupled to the database and configured to communicate with the plurality of test systems to receive the enterprise test result data through operation of the data management software components on the plurality of test systems;
- wherein at least a portion of the plurality of test systems comprise a data management enable module configured to selectively enable or disable operation of the data management software component.

22. The enterprise test data management system of claim 21, wherein the data management enable module comprises a software switch accessible through external communication interfaces of the test systems.

23. An enterprise test data management system, comprising:
- a plurality of test systems configured to operate test software to conduct at least one test on a device in order to obtain test result data associated with that device, at least two of the test systems being directed to different test operations;
- data management software components configured to operate on the test systems and to automatically communicate test result data through communication interfaces for the test systems;
- a database configured to store the test result data related to test operations of the plurality of test systems; and
- a server system coupled to the database and configured to communicate with the plurality of test systems to receive the enterprise test result data through operation of the data management software components on the plurality of test systems;
- wherein the data management software component stores test data on the test system if a connection to the server system is not active; and
- wherein the test system transmits data automatically when a connection to the server system subsequently becomes active.

24. A method for managing enterprise test data, comprising:
- operating data management software components on a plurality of enterprise test systems, each of the test systems being configured to operate test software to conduct at least one test on a device and to produce enterprise test result data, and wherein at least two of the test systems being directed to different test operations;
- automatically communicating the test result data through communication interfaces for the test systems utilizing the data management software components;
- utilizing a server system to communicate with the plurality of test systems to receive the enterprise test result data from the test systems through operation of the data management software components on the plurality of test systems;
- storing the enterprise test result data from the test systems in a database;
- storing enterprise test result data on the test systems if a connection to the server system is not active; and
- automatically transmitting the enterprise test result data when a connection to the server system subsequently becomes active.

\* \* \* \* \*